United States Patent

Wang et al.

[11] Patent Number: 5,706,331
[45] Date of Patent: Jan. 6, 1998

[54] SYSTEM AND METHOD FOR SELECTING A SUBSYSTEM FOR MESSAGE TRAFFIC IN AN INTEGRATED COMMUNICATION NETWORK

[75] Inventors: Zhonghe Wang, Lakeworth; Richard C. Bernhardt, Wellington, both of Fla.

[73] Assignee: Motorola, Inc., Schaumburg, Ill.

[21] Appl. No.: 517,651

[22] Filed: Aug. 22, 1995

[51] Int. Cl.⁶ ............... H04Q 7/10; H04Q 7/18; H04Q 7/30
[52] U.S. Cl. .......... 379/58; 379/57; 340/825.44; 455/38.1; 370/402
[58] Field of Search ............ 379/57, 58; 370/85.13, 370/124, 362, 364, 401, 402; 340/825, 825.07, 825.21, 825.3, 825.44; 455/38.1

[56] References Cited

U.S. PATENT DOCUMENTS

| | | |
|---|---|---|
| 5,148,473 | 9/1992 | Freeland et al. |
| 5,196,842 | 3/1993 | Gomez et al. ............ 340/825.44 |
| 5,210,785 | 5/1993 | Sato et al. .................... 379/58 |
| 5,315,642 | 5/1994 | Fernandez ..................... 379/57 |
| 5,392,452 | 2/1995 | Davis . |

Primary Examiner—Dwayne Bost
Assistant Examiner—Nay Maung
Attorney, Agent, or Firm—Pablo Meles

[57] ABSTRACT

A system and method are shown for selecting an outbound subsystem and an inbound subsystem to be used to communicate between a subscriber unit (10) and an integrated communication system having a number of subsystems (30, 50) that are capable of operating independently. The subscriber unit (10) stores in a memory (77) for each of the different types of messages that the subscriber unit (10) can handle, a list of the subsystems that can be used to communicate the message type wherein each list is ordered according to the subscriber unit's preference for using a subsystem for outbound messages of the particular type. When the subscriber unit receives control information from the integrated system identifying a particular type of message that the system expects to communicate to the subscriber unit, the subscriber unit identifies at least one outbound subsystem in the list stored for the received message type covering the area in which the subscriber unit is located. The subscriber unit then communicates this information to the integrated subsystem using an inbound channel of the most preferred identified subsystem having one. If none of the identified subsystems includes an inbound channel the subscriber unit identifies the most preferred inbound subsystem that the subscriber unit can access regardless of message type.

24 Claims, 3 Drawing Sheets

SYSTEM AND METHOD FOR SELECTING A SUBSYSTEM FOR MESSAGE TRAFFIC IN AN INTEGRATED COMMUNICATION NETWORK

FIELD OF INVENTION

The present invention relates to a system and method for communicating different types of message information to a selective call communication device in an integrated system having a number of subsystems capable of operating independently and more particularly to such a system and method for selecting an outbound subsystem to communicate message information to a subscriber unit and for selecting an inbound subsystem for communicating information from the subscriber unit to the integrated system.

BACKGROUND OF THE INVENTION

Selective call radio frequency devices such as pagers and cordless telephones, i.e. CT-2 handsets, cellular telephones, radio telephones, etc. are known for operating in independent communication systems. Integrated communication systems have combined two of these known independent systems as subsystems thereof for communication with combination subscriber units. A combination subscriber unit is a selective call communication device that includes the functionality of the different devices that operate in each subsystem alone, such as a combination pager and cordless telephone. Examples of such integrated systems and/or combination selective call communication devices are described in U.S. Pat. Nos. 5,392,542; 5,148,473; 5,202,912; and 5,307,399.

The subscriber units in an integrated system may have very different functionalities. For example, a subscriber unit may only be able to access one type of subsystem while another subscriber unit may be able to access many different subsystems. Further, the type of messages communicated on the various subsystems to various subscriber units may vary greatly. For example, some different types of messages that might be communicated on the various subsystems may include short alpha-numeric messages, long alpha-numeric messages, graphic information, voice information, etc. Thus, selection of a particular subsystem to communicate a particular type of message to a given subscriber unit can be a very complex process.

SUMMARY OF THE INVENTION

In accordance with the present invention, the disadvantages of prior systems and methods for selecting a subsystem for communicating information in an integrated communication network have been overcome. In accordance with the present invention, a system and method are provided for selecting an outbound subsystem for message information based upon the type of message that is to be communicated. Further, if the selected outbound subsystem does not have an inbound channel accessible by the subscriber unit, the system and method of the present invention select an inbound subsystem based upon the subscriber unit's preference.

More particularly, in accordance with the present invention, information is stored in a subscriber unit identifying, for each of the different types of messages that the subscriber unit can receive, a list of the subsystems capable of communicating the message type wherein the list is ordered according to the subscriber unit's preference. When the subscriber unit receives control information from the integrated system identifying a particular type of outbound message to be communicated to the subscriber unit, the subscriber unit identifies the most preferred subsystem in the list stored for the indicated message type where the subsystem covers the area in which the subscriber unit is located. Thereafter, the subscriber unit communicates to the integrated system, subsystem selection information including the identity of the most preferred subsystem to be used to communicate the outbound message to the subscriber unit.

These and other advantages and novel features of the present invention, as well as details of an illustrated embodiment thereof, will be more fully understood from the following description and drawings.

DESCRIPTION OF THE PREFERRED EMBODIMENT

An integrated communication system in accordance with the present invention includes multiple subsystems that are capable of operating independently. Any one of the subsystems may be either a two-way subsystem or a one-way subsystem. However, the integrated system should include at least one outbound subsystem that is capable of transmitting information or traffic to a subscriber unit 10 on an outbound channel and at least one inbound subsystem that is capable of receiving traffic from a subscriber unit 10 on an inbound channel.

Figure 1:
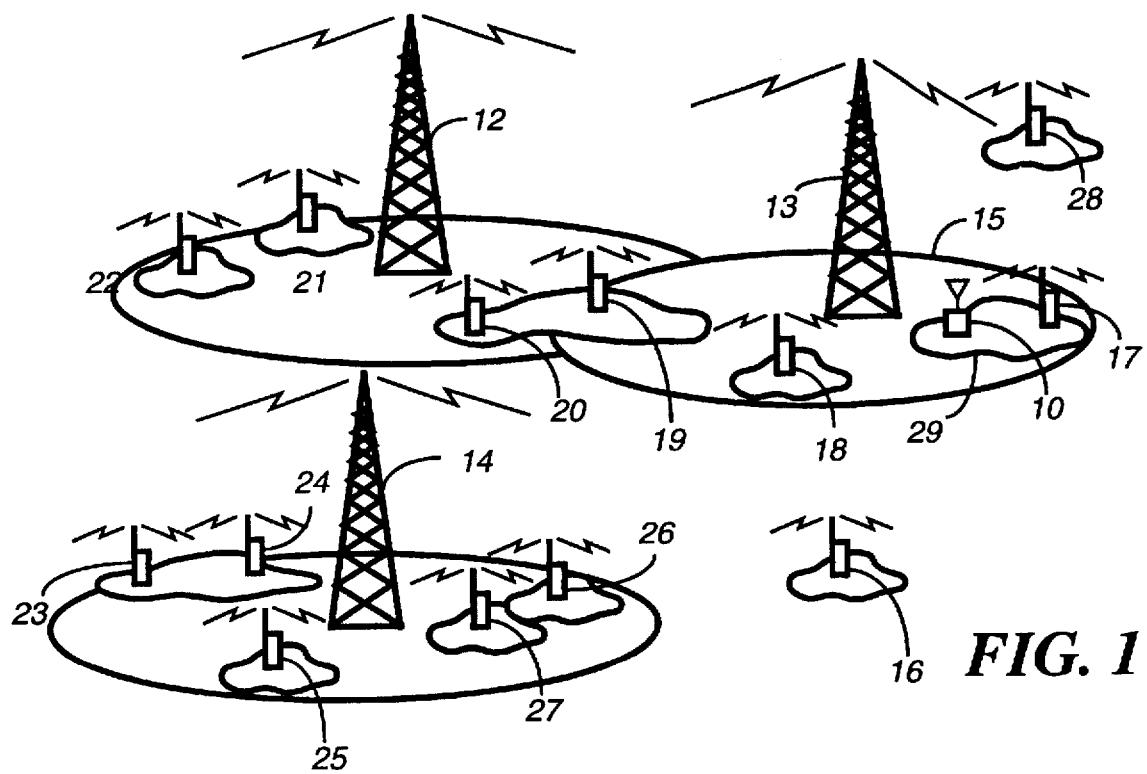
FIG. 1 is an illustration of an integrated system having independent subsystems with wide area and small area coverage.

FIG. 1 illustrates one example of an integrated communication system that includes one or more wide area subsystems with high power based substations 12–14 and one or more small area subsystems having low power transceiver hubs 16–28. A wide area subsystem is highly reliable and has excellent coverage and building penetration. A paging system is an example of a wide area subsystem as is a messaging system where information such as weather, sports, stocks and bonds, etc. is broadcast to multiple subscriber units having a common address. A small area subsystem typically has a very high system capacity for computer connectivity and interactive applications. An example of a small area subsystem is a wireless local area network (WLAN). However, a small area subsystem covers a relatively limited area such as a single building or a complex of buildings in a given location, the coverage area being relatively small due to the low power and high bit rate transceiver employed in such a subsystem. It is noted that although FIGS. 1 and 2 depict wireless subsystems, the subsystems of the integrated system in accordance with the present invention may be wired subsystems as well.

Figure 2:
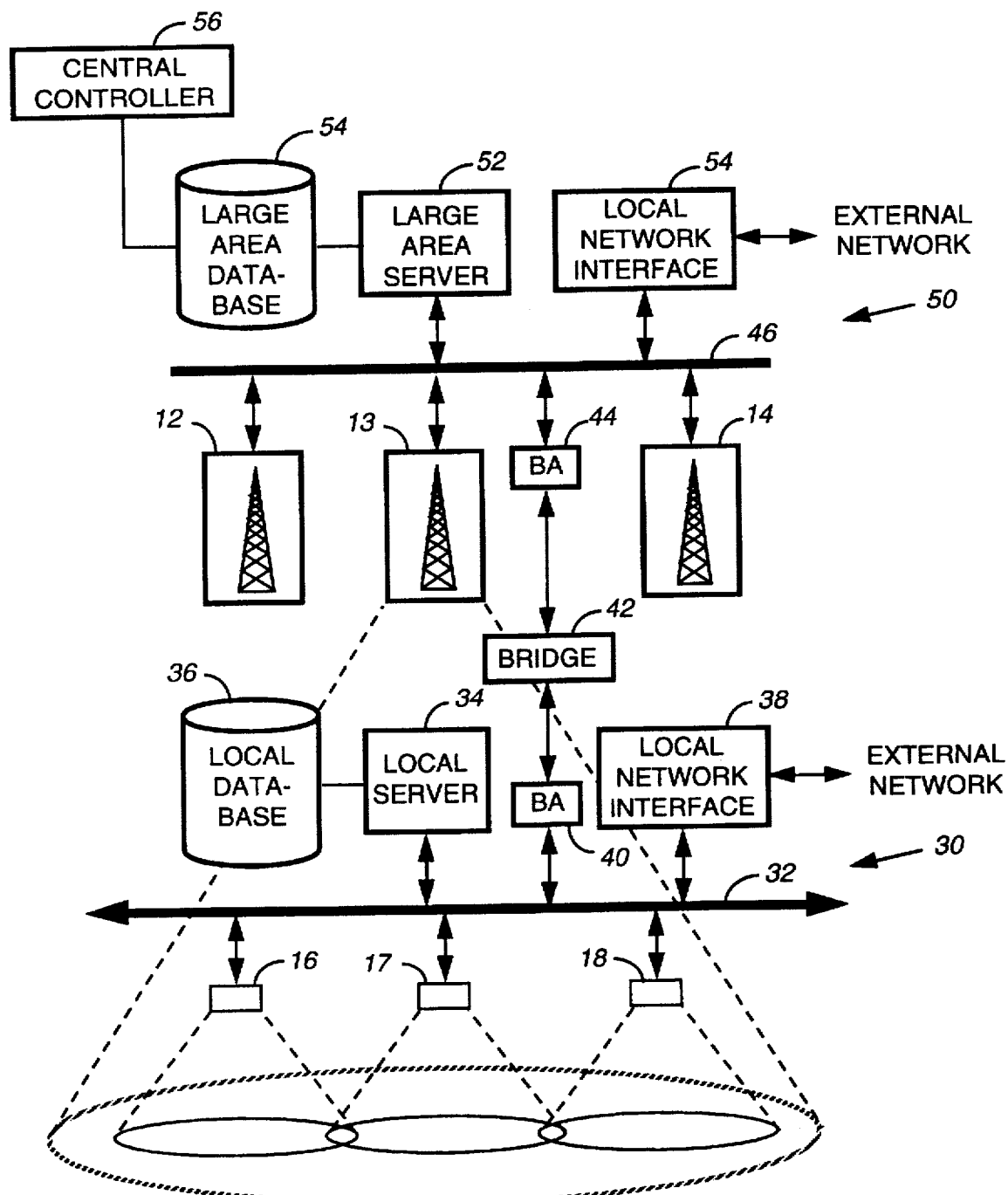
FIG. 2 is a block diagram of a modular radio network architecture for the integrated system depicted in FIG. 1.

FIG. 2 illustrates a possible architecture of the integrated system of FIG. 1. As shown therein, each of the low power, local hub transceivers 16–18 of the small area subsystem 30 is coupled via a small area network 32 to a local server 34 having an associated database 36 that stores registration information, among other things, identifying the locations of the subscriber units registered to the small area subsystem 30. The small area subsystem 30 is connected to an external network that may be wired or wireless via an appropriate local network interface 38. The small area radio network 32 is also coupled via a first bridge adapter 40 to a bridge 42 wherein the bridge 42 is coupled via a second bridge adapter 44 to the large or wide area radio network 46. The bridge 42 may be a software communication link or the like between the small area subsystem 30 and the wide area subsystem 50 to allow communications between these different subsystems or networks 32 and 46. Each of the high power base stations 12–14 of the wide or large area subsystem 50 includes at least one transmitter unit and may include one or more receiver units associated with each transmitter unit. The base stations 12–14 are coupled to a large area server 52 and to a local network interface 54 via the large area radio network 46. The registration information from subscriber units registered to the wide area subsystem 50 is stored in a large area database 54. After a subsystem 30 or 50 receives a registration information from subscriber units 10, the subsystem 30, 50 will communicate the registration information to a central controller 56 of the integrated system. So that the central controller 56 knows where to locate the subscriber unit. It is noted that as shown in FIG. 2, the controller for the wide area subsystem 50 also serves as the central controller 56 of the integrated system. In another embodiment, a central controller that is separate from the controllers of the individual subsystems may be provided. For a national or worldwide integrated system, a layered subscriber location database architecture such as shown in U.S. Pat. No. 5,274,845 assigned to the assignee of the present invention and incorporated herein by reference may be used.

As an example of a page, where one of the wide area subsystems of the integrated system is a wide area paging subsystem, the controller of the subsystem receives input messages or page initiation messages from a telephone or the like. The controller generates paging address and message information in accordance with a particular signalling protocol for transmission to an intended subscriber unit, i.e. a pager. The paging information is coupled from the subsystem controller to either a single transmitter unit such as a transmitter unit 12, 13 or 14 shown for the subsystem 50, or to a number of transmitter units in a zone. The one or more transmitter units transmit the paging information as radio frequency (RF) signals via respective antenna for reception by a particular subscriber unit 10 in accordance with an identification of the subscriber unit that is included in the transmitted information.

Figure 3:
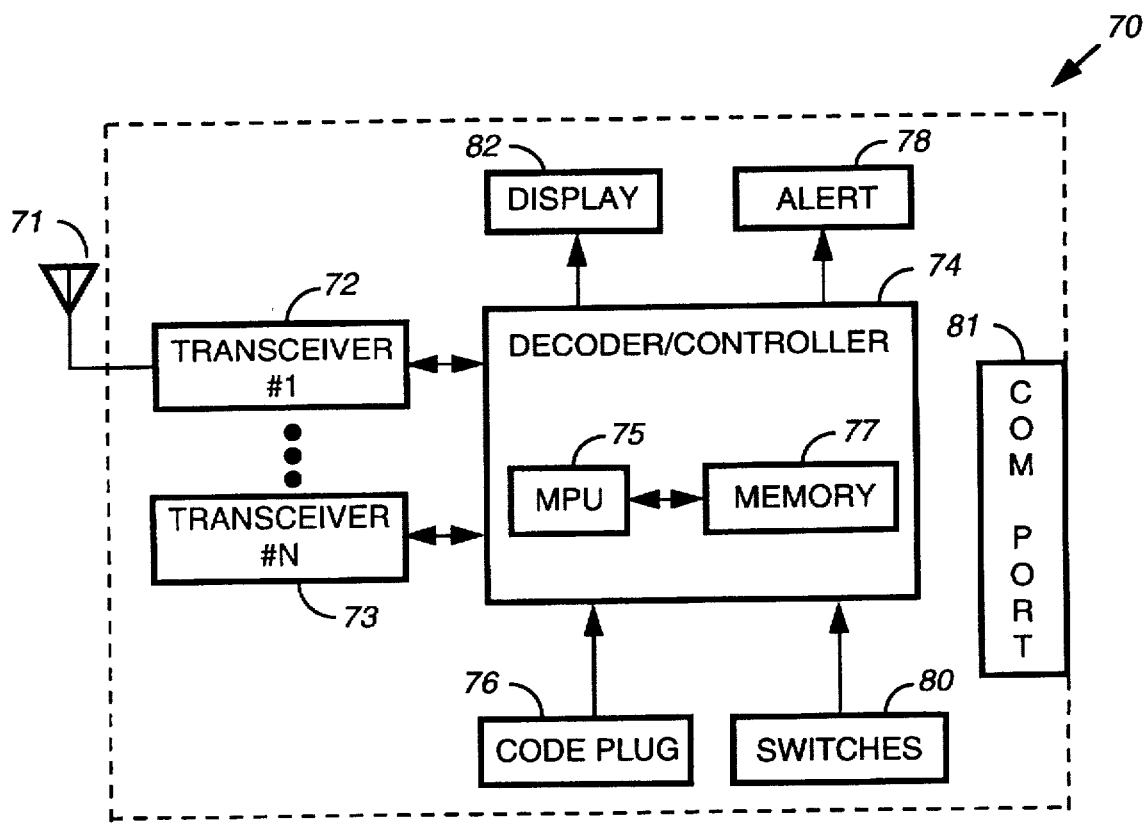
FIG. 3 is a block diagram of a selective call communication device in accordance with the present invention for operation in the integrated system of FIG. 1.

A subscriber unit 10 that is a portable two-way selective call communication device may take the form of a pager 70 as shown in FIG. 3. The pager 70 includes an antenna 71 for intercepting transmitted RF signals and for transmitting RF signals. The antenna 71 couples a received signal to one or more transceivers 72, 73 each of which is provided for communication with a particular subsystem. Each of the transceivers produces a data stream representative of a demodulated received signal coupled to a decoder/controller 74. The transceivers 72, 73 are also responsive to a modulation input such as data received from the decoder/controller 74 to frequency modulate a carrier signal for transmission out from the pager 70. As is well known in the art, the decoder/controller 74 may include a central processing unit such as a microprocessor 75 or the like for processing demodulated signal information in accordance with the software stored in a memory 77 of the decoder/controller 74. The decoder/controller 74 is also responsive to inputs from one or more switches 80 or other input devices to generate data that is coupled to a transceiver 72, 73 for transmission out from the pager 70. The RF signals transmitted by the transmitter units of a paging subsystem typically include control information containing an address that identifies a particular pager 70 and any necessary zone information and/or queries. The page message information follows the control information. The decoder/controller 74 decodes a received address by comparing it with one or more addresses stored in a code plug or code memory 76. If the decoder/controller 74 detects a match between a received address and a stored address, an alert signal may be generated by a device 78 so as to alert a user that a message has been received by the pager 70. The alert signal may be an audible and/or tactile alert such as a silent vibrating alert. It is noted that if the RF signals only contain control information and no user viewable message, an alert need not be generated upon an address match. The switches 80 may be actuated by a user to select between the types of alerts as well as for inputting information to the memory 77 and causing a message stored in the memory of the decoder/controller 74 to be accessed for display on a display 82. The switches 80 may also provide additional functions such reset, read, delete, etc. as is well known. It will be apparent that the switches may form a keyboard. Alternative or additional input devices may also be included in or connected to the subscriber unit such as a touch panel, mouse, etc. The subscriber unit 10 may also include a conventional communication port 81 for hardwire connection to a wired subsystem as well.

In order to aid in locating a subscriber unit 10 in a particular subsystem, the subsystems are divided into zone coverage areas. In an integrated system there are multiple types of zones, for example, the large coverage area zones of a wide area subsystem and the small coverage area zones of a small area subsystem as depicted in FIG. 1. More particularly, a zone is defined as the area covered by a set of transmitter units of a subsystem wherein the transmitter units in a zone simulcast the system control information to the subscriber unit 10. Each zone has a zone identification (ZID) that is included in the control information broadcast by the transmitter units in the zone. The system control information that is transmitted with the ZID also includes an identification of the transmitting subsystem.

Any registration technique may be employed to inform the central controller 56 as to the location of a subscriber unit 10 in the integrated subsystem. Preferably, the registration information includes a subsystem ID, identifying the subsystem to which the subscriber unit is currently registered and/or the subsystem on which the subscriber unit expects to receive outbound messages. This subsystem may be designated as the outbound home subsystem (OHSS) of the subscriber unit. The registration information should also include an identification of the zone in which the subscriber unit is located. An example of a registration process that provides this information is disclosed in the United States patent application filed concurrently herewith and entitled "System and Method for Managing Subscriber Unit Location information In An Integrated Network," Ser. No. 08/517,978, assigned to the assignee of the present invention and incorporated herein by reference.

The subscriber units in the integrated system may have different functionalities. For example, a subscriber unit may only be able to access one type of subsystem while another subscriber unit may be able to access many different subsystems. The types of messages that a subscriber unit can handle may also differ greatly from subscriber unit to subscriber unit. In accordance with the present invention, the subscribers of the integrated system have the freedom of choosing the preferred subsystems to be employed for various types of message information communicated between the integrated system and the subscriber unit. More particularly, the subscriber unit stores in the memory 77, for each type of message information that the subscriber unit can handle, a list of the subsystems that can be accessed to communicate the message type to the subscriber unit. Each list associated with a given message type is organized in decreasing order according to the subscriber unit's preference for using a subsystem to communicate the particular type of message information. The lists are combined in a table designated as the LSS stored in the memory 77. An example of an LSS is as follows

| Type of Message | Preferred Subsystem | Alternative I | Alternative II |
| --- | --- | --- | --- |
| numerical short | S1 | S2 | S3 |
| numerical long | S2 | S3 | S1 |
| alpha-numeric short | S1 | S2 | S3 |
| alpha-numeric long | S2 | S3 | — |
| graphic | S2 | S3 | — |

In this example, the subscriber unit is capable of handling five different types of message information: short numerical messages, long numerical messages, short alpha-numeric messages, long alpha-numeric messages and graphic messages. The subscriber unit is also capable of accessing three different subsystems S1, S2 and S3. The subsystem S1 may be, for example, a wide area paging subsystem; the subsystem S2 may be, for example, a small area subsystem such as a WLAN; and the third subsystem S3 may be a wired subsystem such as the Internet. It can be seen from the LSS in this example that although the subscriber unit can access three subsystems, it prefers to use the WLAN (S2) to carry long numeric, alpha-numeric and graphic messages. If the WLAN is not available, the customer's next preference is to use a wired connection such as S3 to carry this type of message information. If the wired connection S3 is not available either, the long numeric message may be carried on the paging subsystem. It is also clear from the LSS in this example that the subscriber unit prefers the paging network S1 for short numeric and alpha-numeric messages with its next preferred subsystem for these types of messages being the WLAN S2 and thereafter the wired subsystem S3. Many other types of messages may be accommodated in an integrated network in accordance with the present invention in addition to those mentioned above such as voice traffic that is communicated in real time, non-real time voice messages.

It is noted that the LSS need only be stored in the subscriber unit's memory 77, there being no need for the central controller 56 of the integrated system to know this information. If desired, a subscriber unit can be preprogrammed with a default LSS stored in a programmable portion of the memory 77. Preferably, the subscriber is allowed to reprogram the LSS of the subscriber unit 10 utilizing an input device such as the switches 80 depicted for the pager 70 in FIG. 3.

When the integrated system has a message of a particular type to be transmitted on an outbound channel to a subscriber unit 10, the central controller 56 obtains the currently stored registration information for the subscriber unit. This registration information as discussed above will include a zone identification identifying the zone in which a subscriber unit was last located and the outbound home subsystem of the subscriber unit. In order to locate a subscriber unit and to inform the unit that the integrated system has a message of a particular type that is to be communicated to the unit, the central controller 56 causes a "where are you" (WRY) message to be broadcast on the subscriber unit's current outbound home subsystem (OHSS) in the zone identified by the stored zone identification information. This WRY message includes information representing the type of message that the integrated system expects to transmit to the subscriber unit 10 on a selected outbound subsystem.

Figure 4:
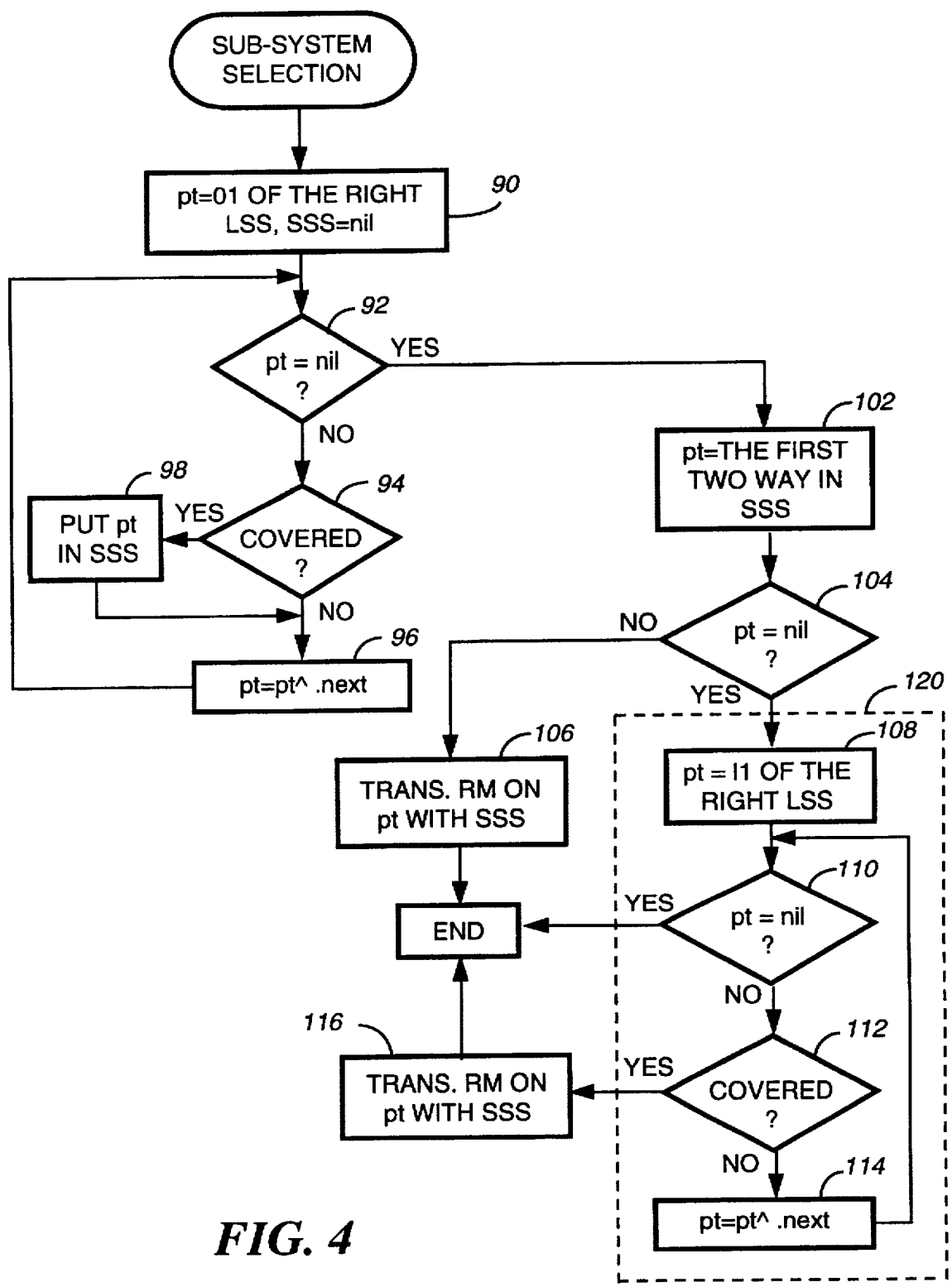
FIG. 4 is a flow chart illustrating a subscriber unit subsystem selection routine in accordance with the present invention.

Upon receiving a WRY message, the subscriber unit 10 operates in accordance with the flow chart depicted in FIG. 4 to identify one or more outbound subsystems from which the subscriber unit can receive the expected message information according to the type of message information that is indicated in the WRY message. The subscriber unit 10 also operates in accordance with the flow chart of FIG. 4 when the subscriber unit itself initiates communication with the integrated system without receiving a WRY message. In this later case, the subscriber unit operates in accordance with FIG. 4 to identify one or more outbound subsystems from which the subscriber unit can receive an expected reply message to its transmitted message according to the type of the expected reply message. In accordance with the flow chart of FIG. 4, the subscriber unit also determines the inbound subsystem to be used to communicate the identity of the one or more possible outbound subsystems to the integrated system.

More particularly, at a block 90, the microprocessor 75 of the subscriber unit initializes a pointer pt to the first or highest priority item in the list in the subscriber unit's stored LSS that is associated with the expected message type to be received from an outbound subsystem as indicated, for example, in a received WRY message. The microprocessor 75 also initializes at block 90 an SSS list to nil wherein the SSS list is utilized to store the identity of the one or more outbound subsystems capable of communicating the expected message type wherein the subsystems cover the current location of the subscriber unit 10 as described below. From block 90, the microprocessor 75 proceeds to block 92 to determine whether the pointer pt is nil. If it is not, the microprocessor 75 determines at block 94 whether the most preferred subsystem identified in the list associated with the expected message type covers the current location of a subscriber unit.

In order to determine whether a wireless outbound subsystem covers the current location of the subscriber unit 10, the subscriber unit 10 tries to synchronize to the wireless subsystem. If the subscriber unit 10 receives and correctly decodes system control information from the indicated subsystem, then the subscriber unit 10 determines that the identified subsystem does cover the current location of the subscriber unit. The system control information decoded by the subscriber unit may include the identification of the subsystem from which the information was received; the identification of the zone in which the information was transmitted; and the identification of the particular transmitter unit in the zone that transmitted the information. The subscriber unit upon receiving an RF signal measures its signal strength. The subscriber unit then determines the identity of the transmitter unit with the strongest signal in a given zone and subsystem from which the unit 10 received system control information. The identity of the strongest transmitter unit, zone and subsystem are then stored in the memory 77. It is noted that in order to determine whether a wired subsystem covers the current location of a subscriber unit, the microprocessor 75 determines whether it can currently access the wired subsystem.

If the microprocessor 75 determines that the subsystem indicated by the pointer pt does cover the current location of the subscriber unit, the microprocessor proceeds from block 94 to block 98 to insert the identity of the subsystem in the list SSS along with the zone identification received therewith and the identity of the strongest transmission unit. If the subsystem indicated by the pointer pt does not cover the current location of the user, the microprocessor 75 proceeds to block 96 to increment the pointer pt to the next most preferred subsystem in the list of the LSS associated with the expected message type. After the microprocessor 75 identifies each of the subsystems in the list of the LSS associated with the expected message type that covers the current location of the subscriber unit 10, the microprocessor 75 proceeds from block 92 to block 102.

The microprocessor 75, at block 102, sets a pointer to the first entry in the SSS list that is a two-way subsystem, i.e. the most preferred outbound subsystem for the expected message type covering the subscriber unit's current location and having an inbound channel. If the pointer identifies a two-way subsystem in the SSS list as determined at block 104, the microprocessor proceeds to block 106. At block 106, the microprocessor 75 generates a reply message and controls the transceiver 72 to transmit the reply message on an inbound channel of the identified two-way subsystem. This reply message includes, among other things, an identification of the subscriber unit 10, as well as the SSS list which, as described above, includes in order of preference the identity of one or more subsystems suitable for the expected traffic covering the current location of the subscriber unit and in association with the wireless subsystems identified, a zone identification and identification of the strongest transmitter unit. It is noted that in an alternative embodiment of the present invention, the SSS may take the form of a record instead of a list wherein the SSS record stores only the most preferred outbound subsystem that is capable of handling the expected message information and that covers the current location of the user. Such an embodiment is simpler. However, the integrated system has no choice but to use the single identified outbound subsystem for communicating the message information. When the SSS includes a list of subsystems, the integrated system may select a particular subsystem based on availability, quality, etc. as well as the subscriber unit's preference.

The microprocessor 75 will proceed to block 108 if none of the subsystems contained in the SSS list includes an inbound channel accessible by the subscriber unit or if the SSS list is nil or empty. In the later case even though there currently is no outbound channel for the expected message type, the subscriber unit can communicate this information to the integrated system on an available inbound subsystem. The integrated system can then respond to the subscriber unit by transmitting a message of a different type, but preferably related to the expected message, on an outbound subsystem covering the current location of the subscriber unit and capable of handling the different type message.

At block 108, the microprocessor 75 sets a pointer to the first entry in an ordered inbound list. This inbound list contains a list of all of the inbound subsystems that the subscriber unit can access regardless of message type wherein the list is ordered according to the subscriber unit's preference in using a subsystem as an inbound subsystem. After setting the pointer at block 108, the microprocessor 75 proceeds to block 110 to determine whether the pointer is nil. If not, the microprocessor proceeds to block 112. At block 112, the microprocessor 75 determines whether the inbound subsystem identified by the pointer set at block 108 covers the current location of the subscriber unit. It is noted that each inbound subsystem may be associated with an outbound subsystem such that if the subscriber unit is in the area covered by the outbound subsystem associated with an inbound subsystem, then it is determined that the inbound subsystem covers the current location of the subscriber unit. The subscriber unit determines whether the outbound subsystem covers the current location of the subscriber unit in the same manner as discussed above with reference to block 94. If the inbound subsystem indicated by the pointer pt does cover the current location of the subscriber unit, the microprocessor 75 proceeds to block 116 to generate the reply message as discussed above and to transmit the reply message on the inbound subsystem identified at block 112. If the most preferred inbound subsystem does not cover the current location of the subscriber unit 10, the microprocessor 75 proceeds to block 114 to increment the pointer to indicate the next most preferable inbound subsystem. Thereafter the microprocessor 75 returns to block 110 as discussed above. It is noted that the inbound subsystem selection process indicated by the dashed box 120 may also be used to find the proper inbound subsystem when a subscriber unit 10 initiates a connection to the integrated system.

Upon receiving a reply message from a subscriber unit, the central controller 56 of the integrated system has knowledge not only of the current location of the subscriber unit, i.e. zone, but also the identity of the preferred outbound subsystems covering the unit 10 and their strongest transmission unit. The central controller 56 also knows from the reply message, the identification of the inbound subsystem used to communicate the reply message and the identity of the inbound system receiver i.e. the receiver that received and correctly decoded the inbound reply message from the subscriber unit. The central controller 56 may select the outbound subsystem identified in the received SSS list that is the first subsystem available to communicate the expected message information to the subscriber unit. The central controller 56 may also base its selection of a particular outbound subsystem identified in the received SSS list on quality considerations as well or in the alternative. After selecting the outbound subsystem that is to transmit the expected message information to the subscriber unit, the central controller 56 of the integrated system will cause a "where to listen" (WTL) message to the subscriber unit 10 on the selected outbound subsystem. Alternatively, the subscriber unit's outbound home subsystem may be utilized to transmit the WTL message. The WTL message directs the subscriber unit 10 to the chosen outbound subsystem, selected zone and transmitter unit that will be used to communicate the expected message information to the subscriber unit.

Thus, it can be seen that the subsystem selection process in accordance with the present invention is flexible, efficient, and takes into consideration the preference of the subscriber. Therefore, message information will be communicated to the subscriber unit using the best outbound subsystem of a number of subsystems of the integrated system. This selected outbound subsystem may or may not be the same as the inbound or outbound subsystem used to communicate control information. Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. A method of operating a subscriber unit capable of receiving system control information and message information of different types from a plurality of subsystems in an integrated system, said subsystems being capable of operating independently and in communication with central controller of said integrated system and said plurality of subsystems including at least one outbound subsystem capable of communicating information to the subscriber unit on an outbound channel and at least one inbound subsystem capable of receiving information communicated from the subscriber unit on an inbound channel, said method comprising:

storing information identifying, for each of said different types of messages that said subscriber unit can receive, a list of the subsystems capable of communicating the message type and said list being ordered according to the subscriber unit's preference;

receiving control information from said integrated system identifying a particular type of outbound message to be communicated to the subscriber unit;

identifying a most preferred subsystem in the list stored for said received message type covering an area in which said subscriber unit is located; and communicating to said integrated system, subsystem selection information including the identity of said most preferred subsystem covering the area in which said subscriber unit is located.

2. A method of operating a subscriber unit in an integrates system as recited in claim 1 including the steps of determining whether the most preferred subsystem for said message type has an inbound channel for receiving communications from the subscriber unit and if said most preferred subsystem does have said inbound channel, communicating said subsystem selection information on said inbound channel of said most preferred subsystem for said message type.

3. A method of operating a subscriber unit in an integrated system as recited in claim 2 including the steps of storing an inbound list of preferred inbound subsystems that said subscriber unit is capable of accessing; and in response to a determination that said most preferred subsystem for said message type does not have an inbound channel, identifying from said inbound list a most preferred inbound subsystem covering the location of said subscriber unit for communicating said subsystem selection information on.

4. A method of operating a subscriber unit capable of receiving system control information and message information of different types from a plurality of subsystems in an integrated system, said subsystems being capable of operating independently and in communication with central controller of said integrated system and said plurality of subsystems including at least one outbound subsystem capable of communicating information to the subscriber unit on an outbound channel and at least one inbound subsystem capable of receiving information communicated from the subscriber unit on an inbound channel, said method comprising:

storing information identifying, for each of said different types of messages that said subscriber unit can receive, a list of the subsystems capable of communicating the message type and said list being ordered according to the subscriber unit's preference;

receiving control information from said integrated system identifying a particular type of outbound message to be communicated to the subscriber unit;

identifying each of the subsystems in the list stored for said received message type covering an area in which said subscriber unit is located; and communicating to said integrated system, subsystem selection information including the identity of the identified subsystems in the list stored for the received message type covering the area in which the subscriber unit is located.

5. A method of operating a subscriber unit in an integrates system as recited in claim 4 including the steps of identifying the most preferred subsystem for said message type covering the area of said subscriber unit that has an inbound channel for receiving communications from the subscriber unit and communicating said subsystem selection information on said most preferred subsystem with the inbound channel.

6. A method of operating a subscriber unit in an integrated system as recited in claim 2 including the steps of storing an inbound list of preferred inbound subsystems that said subscriber unit is capable of accessing; and in response to a determination that none of said subsystems for said message type covering the unit's location have an inbound channel, identifying from said inbound list a most preferred inbound subsystem covering the location of said subscriber unit for communicating said subsystem selection information on.

7. A method of selecting a subsystem for communicating message information to a subscriber unit capable of receiving system control information and message information of different types from a plurality of subsystems in an integrated system, said subsystems being capable of operating independently and in communication with central controller of said integrated system and said plurality of subsystems including at least one outbound subsystem capable of communicating information to the subscriber unit on an outbound channel and at least one inbound subsystem capable of receiving information communicated from the subscriber unit on an inbound channel, said method comprising:

storing in said subscriber unit information identifying, for each of said different types of messages that said subscriber unit can receive, a list of the subsystems capable of communicating the message type;

receiving control information from said integrated system identifying a particular type of outbound message to be communicated to the subscriber unit;

identifying each of the subsystems in the list stored for said received message type covering an area in which said subscriber unit is located;

communicating to said integrated system, subsystem selection information including the identity of the identified subsystems in the list stored for the received message type covering the area in which the subscriber unit is located;

receiving in the integrated subsystem said subsystem selection information; and selecting a subsystem for communicating said outbound message to said subscriber unit from the subsystems identified in said received subsystem selection information based upon the availability of said identified subsystems to communicate said outbound message to said subscriber unit.

8. A method of selecting a subsystem for communicating message information to a subscriber unit capable of receiving system control information and message information of different types from a plurality of subsystems in an integrated system, said subsystems being capable of operating independently and in communication with central controller of said integrated system and said plurality of subsystems including at least one outbound subsystem capable of communicating information to the subscriber unit on an outbound channel and at least one inbound subsystem capable of receiving information communicated from the subscriber unit on an inbound channel, said method comprising:

storing in said subscriber unit information identifying, for each of said different types of messages that said subscriber unit can receive, a list of the outbound subsystems capable of communicating the message type;

receiving control information from said integrated system identifying a particular type of outbound message to be communicated to the subscriber unit;

identifying each of the outbound subsystems in the list stored for said particular message type covering an area in which said subscriber unit is located;

communicating to said integrated system, subsystem selection information including the identity of the identified outbound subsystems in the list stored for the received message type covering the area in which the subscriber unit is located;

receiving in the integrated subsystem said subsystem selection information;

selecting one of said outbound subsystems identified in said received subsystem selection information; and communicating said outbound message to said subscriber unit on said one outbound subsystem.

9. A method of selecting a subsystem for communicating message information to a subscriber unit capable of receiving system control information and message information of different types from a plurality of subsystems in an integrated system, said subsystems being capable of operating independently and in communication with central controller of said integrated system and said plurality of subsystems including at least one outbound subsystem capable of communicating information to the subscriber unit on an outbound channel and at least one inbound subsystem capable of receiving information communicated from the subscriber unit on an inbound channel, said method comprising:

communicating system control information to a subscriber unit, said control information identifying a particular type of outbound message information to be communicated to said integrated system;

receiving subscriber control information from a subscriber unit responsive to said system control information, said subscriber control information including the identity of a plurality of outbound subsystems capable of communicating said particular message type and covering an area in which said subscriber unit is located;

selecting one of said plurality of identified outbound subsystems for communicating outbound message information of the particular type; and communicating said outbound message information on said selected outbound subsystem.

10. A method of selecting a subsystem for communicating message information to a subscriber unit in an integrated system as recited in claim 9 including the step of communicating a message to the subscriber unit informing the subscriber unit of the subsystem selected to communicate the outbound message information.

11. A method of selecting a subsystem for communicating message information to a subscriber unit in an integrated system as recited in claim 9 wherein said one outbound subsystem is selected based on its availability to communicate said outbound message information before another of said subsystems.

12. A method of selecting a subsystem for communicating message information to a subscriber unit in an integrated system as recited in claim 9 wherein said one outbound subsystem is selected based on the quality of said one subsystem.

13. A method of selecting a subsystem for communicating message information to a subscriber unit in an integrated system as recited in claim 9 wherein said subscriber control information indicates the preference of the subscriber unit for utilizing the identified outbound subsystems for the particular message type and said one outbound subsystem is selected based on said subscriber unit's preference.

14. A method of selecting a subsystem for communicating message information to a subscriber unit capable of receiving system control information and message information of different types from a plurality of subsystems in an integrated system, said subsystems being capable of operating independently and in communication with central controller of said integrated system and said plurality of subsystems including at least one outbound subsystem capable of communicating information to the subscriber unit on an outbound channel and at least one inbound subsystem capable of receiving information communicated from the subscriber unit on an inbound channel, said method comprising:

communicating system control information to a subscriber unit, said control information identifying a particular type of outbound message information to be communicated to said integrated system;

receiving subscriber control information from a subscriber unit responsive to said system control information, said subscriber control information including the identity of at least one outbound subsystem capable of communicating said particular message type and covering an area in which said subscriber unit is located; and communicating said outbound message information on said selected outbound subsystem.

15. A system for operating a subscriber unit capable of receiving system control information and message information of different types from a plurality of subsystems in an integrated system, said subsystems being capable of operating independently and in communication with central controller of said integrated system and said plurality of subsystems including at least one outbound subsystem capable of communicating information to the subscriber unit on an outbound channel and at least one inbound subsystem capable of receiving information communicated from the subscriber unit on an inbound channel, said system comprising:

a memory for storing information identifying, for each of said different types of messages that said subscriber unit can receive, a list of the subsystems capable of communicating the message type;

a receiver for receiving control information from said integrated system identifying a particular type of outbound message to be communicated to the subscriber unit;

a processor for identifying an outbound subsystem in the list stored for said received message type covering an area in which said subscriber unit is located; and communication means for communicating to said integrated system, subsystem selection information including the identity of said most preferred subsystem for said message type covering the area in which said subscriber unit is located.

16. A system for operating a subscriber unit in an integrated system as recited in claim 15 wherein said communication means includes a transmitter for wireless communication of said subsystem information.

17. A system for operating a subscriber unit in an integrated system as recited in claim 15 wherein said communication means includes a port for a hardwire connection to a subsystem.

18. A system for operating a subscriber unit in an integrated system as recited in claim 15 wherein said processor identifies the most preferred subsystem identified for said message type covering the area of said subscriber unit that has an inbound channel for receiving communications from the subscriber unit and said communication means communicates said subsystem selection information on said most preferred subsystem with the inbound channel.

19. A system for operating a subscriber unit in an integrated system as recited in claim 16 wherein said memory stores an inbound list of preferred inbound subsystems that said subscriber unit is capable of accessing; and in response to a determination that none of said subsystems covering the unit have said inbound channel, said processor identifies from said inbound list a most preferred inbound subsystem covering the location of said subscriber unit for communicating said subsystem selection information on.

20. A system for operating a subscriber unit capable of receiving system control information and message information of different types from a plurality of subsystems in an integrated system, said subsystems being capable of operating independently and in communication with central controller of said integrated system and said plurality of subsystems including at least one outbound subsystem capable of communicating information to the subscriber unit on an outbound channel and at least one inbound subsystem capable of receiving information communicated from the subscriber unit on an inbound channel, said system comprising:

a memory for storing information identifying, for each of said different types of messages that said subscriber unit can receive, a list of the subsystems capable of communicating the message type and said list being ordered according to the subscriber unit's preference for communicating the message type on a subsystem;

a receiver for receiving control information from said integrated system identifying a particular type of outbound message to be communicated to the subscriber unit;

a processor for identifying each of the subsystems in the list stored for said received message type covering an area in which said subscriber unit is located; and communication means for communicating to said integrated system subsystem selection information including the identity of all of the identified subsystems in the list stored for the received message type covering the area in which the subscriber unit is located.

21. A system for operating a subscriber unit in an integrated system as recited in claim 20 wherein said communication means includes a transmitter for wireless communication of said subsystem information.

22. A system for operating a subscriber unit in an integrated system as recited in claim 20 wherein said communication means includes a port for a hardwire connection to a subsystem.

23. A system for operating a subscriber unit in an integrates system as recited in claim 20 wherein said processor determines whether a subsystem identified for said message type covering the area of said subscriber unit has an inbound channel for receiving communications from the subscriber unit and if one of said subsystem does have said inbound channel, communicating said subsystem selection information on a most preferred one of said subsystems with an inbound channel.

24. A system for operating a subscriber unit in an integrated system as recited in claim 23 wherein said memory stores an inbound list of preferred inbound subsystems that said subscriber unit is capable of accessing; and in response to a determination that none of said subsystems for said message type have an inbound channel, identifying from said inbound list a most preferred inbound subsystem covering the location of said subscriber unit for communicating said subsystem selection information on.

* * * * *